United States Patent [19]

Megerle et al.

[11] Patent Number: 5,718,489
[45] Date of Patent: Feb. 17, 1998

[54] HYDRAULIC UNIT FOR TRACTION-CONTROLLED MOTOR VEHICLE BRAKE SYSTEMS

[75] Inventors: Friedrich Megerle, Sonthofen; Michael Friedow, Tamm; Juergen Lander; Georg Spalding, both of Stuttgart; Johann Guggemos, Blaichach; Hermann Hoelle, Blaichach; Michael Specker, Blaichach; Guenther Schnalzger, Blaichach; Hubert Hueber, Weitnau; Dietmar Sommer, Schwieberdingen, all of Germany

[73] Assignee: Robert Bosch GmbH, Stuttgart, Germany

[21] Appl. No.: 633,731

[22] PCT Filed: Oct. 12, 1994

[86] PCT No.: PCT/DE94/01193

§ 371 Date: Jul. 24, 1996

§ 102(e) Date: Jul. 24, 1996

[87] PCT Pub. No.: WO95/11150

PCT Pub. Date: Apr. 27, 1995

[30] Foreign Application Priority Data

Oct. 22, 1993 [DE] Germany ............. 43 36 092.0

[51] Int. Cl.⁶ ............. B60T 8/36; F16K 31/06; F15B 13/08; F15B 9/12
[52] U.S. Cl. ............. 303/119.2; 303/113.1
[58] Field of Search ............. 303/119.2, 113.1, 303/900, 901, 113.2; 137/596.17; 251/129.15–129.22

[56] References Cited

U.S. PATENT DOCUMENTS

| 5,324,134 | 6/1994 | Kaes et al. ............. 303/119.2 |
| 5,333,836 | 8/1994 | Fukuyo et al. ............. 303/119.2 |
| 5,333,946 | 8/1994 | Goossens et al. ............. 303/119.2 |
| 5,335,984 | 8/1994 | Alaze et al. ............. 303/119.2 |
| 5,542,755 | 8/1996 | Staib et al. ............. 303/119.2 |

FOREIGN PATENT DOCUMENTS

| 3810581 | 10/1989 | Germany . |
| 4030571 | 4/1992 | Germany . |
| 4202389 | 8/1993 | Germany . |
| 4330616 | 3/1994 | Germany . |
| 9117378 | 11/1991 | WIPO . |
| 9319961 | 10/1993 | WIPO . |
| 9401708 | 1/1994 | WIPO . |
| 9511150 | 4/1995 | WIPO . |

*Primary Examiner*—Douglas C. Butler

[57] ABSTRACT

An electromagnetically actuated valve of a hydraulic unit is received in pressure-tight fashion and mounted without complicated adjustment of the valve stroke. The valve comprises a hydraulic part and an electrical part. The hydraulic part is a pre-mounted unit with a stroke of a seat valve set before insertion into a receiving bore of a metal valve block. The hydraulic part is received in pressure-tight fashion in the valve block by a first swaged connection located between an inlet conduit and an outlet conduit of the receiving bore. A sealing ring that closes off the receiving bore is retained by a radially extending flange of a bushing slipped onto the hydraulic part. The flange is secured to the valve block by a second swaged connection. The hydraulic unit is usable for traction-controlled motor vehicle brake systems.

8 Claims, 2 Drawing Sheets

HYDRAULIC UNIT FOR TRACTION-CONTROLLED MOTOR VEHICLE BRAKE SYSTEMS

BACKGROUND OF THE INVENTION

The invention is based on a hydraulic unit for slip-controlled motor vehicle brake systems.

One such hydraulic unit is already known (DE 42 02 389 A1), in which the electromagnetically actuated valve is mounted in the valve block as a subassembly comprising a hydraulic and an electric part. The valve block has a deep, sharply stepped receiving bore, into whose bottom, small-diameter portion an inlet conduit and an outlet conduit open out. The hydraulic part of the valve, forming a pre-mounted unit engaging this portion of the bore, has two sealing rings on the circumference of its sleeve that receives a valve body, a magnet armature and a magnet core; of the sealing rings, one is disposed between the conduits and the other is disposed toward the boundary plane of the valve block and is axially supported by the electrical part of the valve. For that purpose, the electrical part engages a large-diameter portion of the receiving bore, on the side toward the boundary plane, and is retained in this bore by a positive connection by means of a retaining ring press-fitted into an undercut of the bore. In this known embodiment, the pressure fluid forces acting on the hydraulic part must be absorbed by the electrical portion and transmitted to the valve block by the positive connection. The electrical part is therefore exposed to relatively major forces. Moreover, the embodiment of this connection is expensive and requires a large amount of space.

A space-saving way that is more favorable in terms of force dissipation to fasten an electromagnet valve and a valve block of a hydraulic unit for traction-controlled brake systems is known from DE-40 30 571 A1. There, the valve comprises a hydraulic part and an electrical part mounted on it. The hydraulic part is not a premounted unit. Instead, it is made up of individual parts installed on the valve block; that is, first a valve body with a valve seat is inserted into a stepped receiving bore and secured by means of a swaged connection. A guide disk for a valve needle is inserted into the bore after that and secured. Near the boundary plane of the valve block, a bushing is then inserted into the receiving bore. The bushing serves to receive a valve sleeve, widened in funnellike fashion on its end, which receives a magnet armature and a magnet core. The valve sleeve is secured in the valve block by a swaged connection, in which material positively displaced from the edge of the receiving bore covers the funnellike sleeve portion supported by the bushing. This swaged connection is heavily loaded hydraulically and requires absolute tightness. It can therefore be achieved only in a valve block made of steel (see DE 38 10 581 A1). Adjusting the valve stroke is made substantially more difficult in this embodiment, however, because the valve stroke is to a great extent dependent on the tolerances of the aforementioned individual parts of the hydraulic part, the tolerances of the receiving bore, and the quality of the swaged connections. Defects in the hydraulic part of the valve that occur after the swaged connections have been made are no longer repairable.

ADVANTAGES OF THE INVENTION

The hydraulic unit according to the invention has the advantage over the prior art that securing of the hydraulic part is done by means of the first swaged connection in a region remote from the mouth of the receiving bore, which reduces the demands made on the material of the valve block and on the swaged connection, so that instead of steel, ductile light metal, for instance, can also be used. Sealing off of the receiving bore from the outside is now done instead by the sealing ring, placed against the boundary plane of the valve block. The load on it by hydraulic forces is advantageously absorbed by the flange secured to the second swaged connection. One quite essential advantage, however, is the use of the hydraulic part as a premounted unit, because it is not subject to any alteration of the preset valve stroke in the course of the joining process in the valve block, which can also be done in only a few work steps. The hydraulic unit can thus be made economically and with high quality.

By means of the provisions recited, advantageous further developments of and improvements to the hydraulic unit recited herein are possible.

An especially advantageous provision is the inclusion of the sleeve of the hydraulic part in the first swaged connection, in that the sleeve is surrounded in the annular groove by displaced material of the valve block and is pressed intimately against the valve body. The load-bearing capacity of the sleeve for hydraulic forces is increased considerably thereby. Moreover, sealing of the hydraulic part between the sleeve and the valve body is improved.

BRIEF DESCRIPTION OF THE DRAWINGS

Exemplary embodiments of the invention are shown in simplified form in the drawings and described in further detail in the ensuing description.

DETAILED DESCRIPTION OF THE EXEMPLARY EMBODIMENTS

Figure 1:
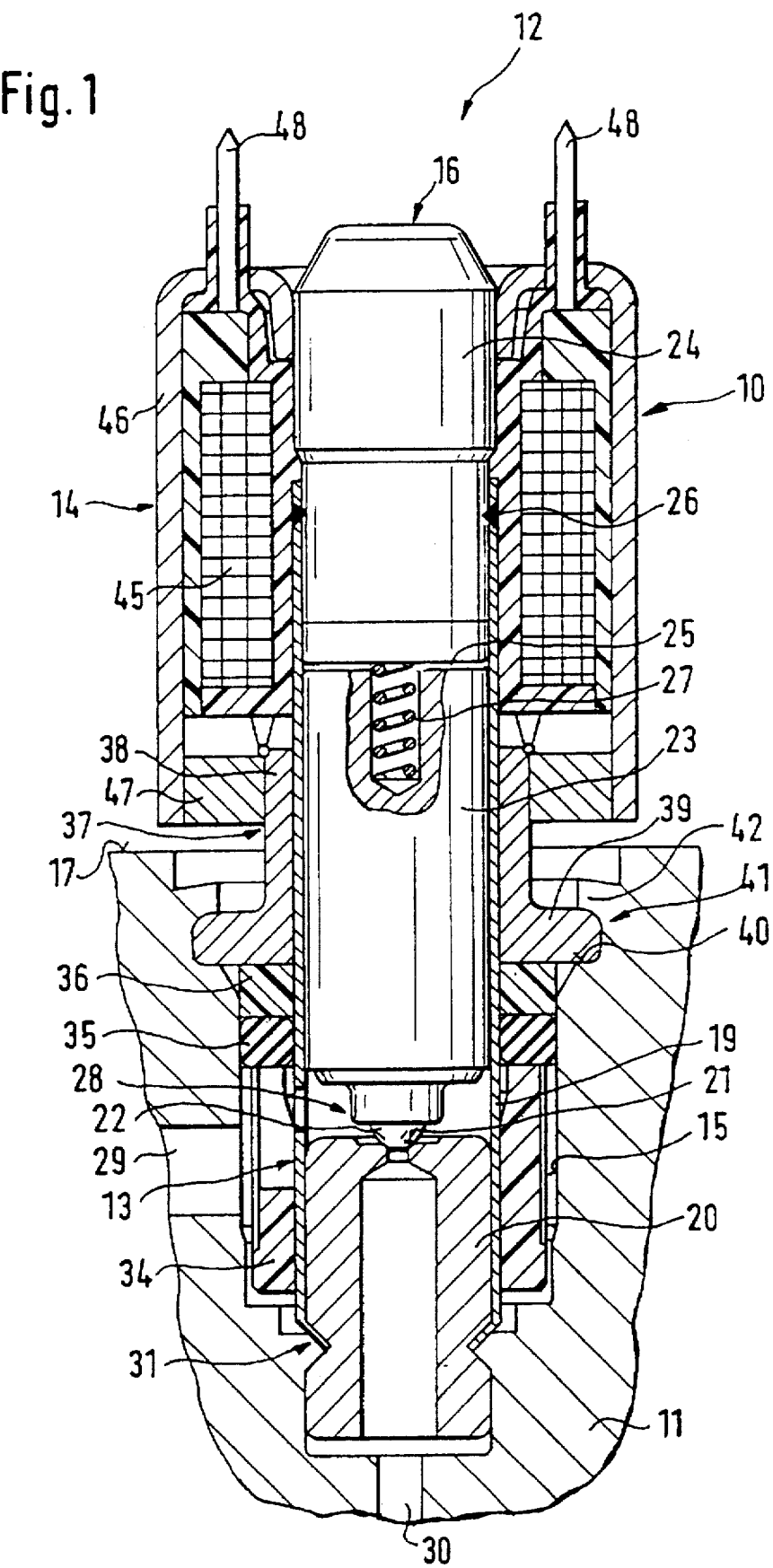
FIG. 1 is a longitudinal section through an electromagnetically actuatable valve which is secured by swaged connections in the valve block of a hydraulic unit for traction-controlled motor vehicle brake systems.
Figure 2:
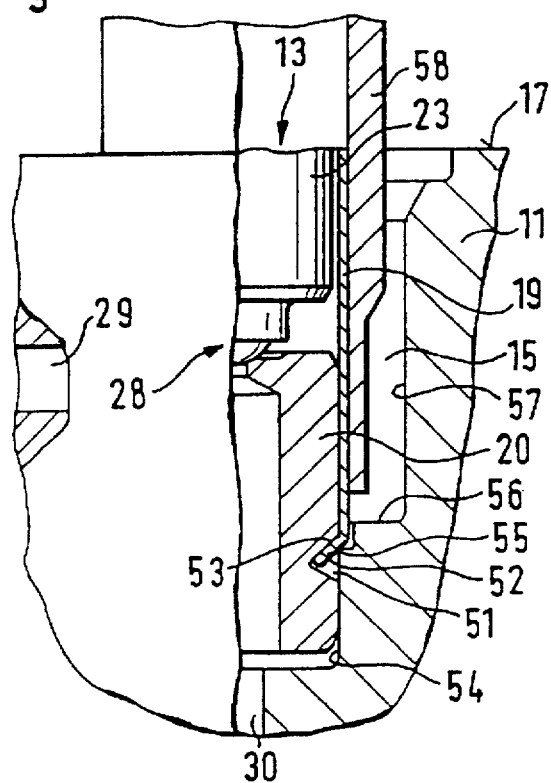
FIG. 2 shows a first exemplary embodiment of a connection between the sleeve and a valve body of the hydraulic part of the valve before the swaged connection is made.
Figure 3:
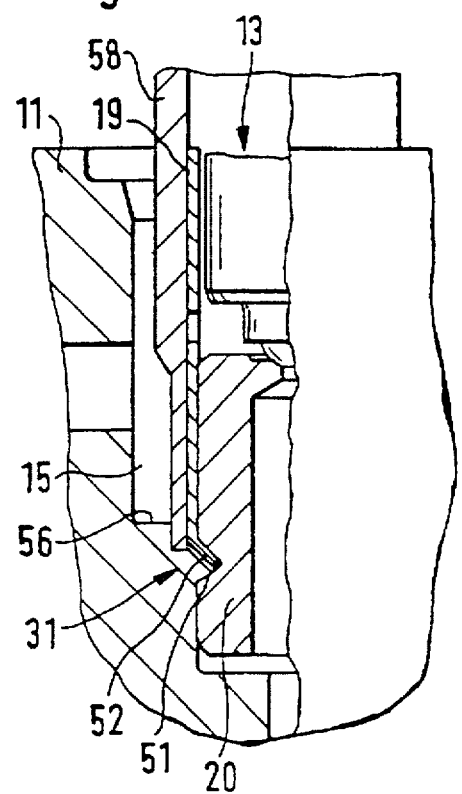
FIG. 3 shows this after the swaged connection has been made.

An electromagnetically actuated valve 10 shown in FIG. 1 is disposed on a valve block 11 and forms part of a hydraulic unit 12, not otherwise shown, for traction-controlled brake systems in motor vehicles. The valve 10 comprises a hydraulic part 13 and an electrical part 14. The hydraulic part 13 is substantially received and secured in a stepped receiving bore 15 of the valve block 11, which is of a ductile aluminum alloy. In the extension of the receiving bore 15, the hydraulic part 13 protrudes with a valve dome 16 beyond a boundary plane 17 of the valve block 11. The electrical part 14 is mounted on the valve dome 16.

The hydraulic part 13 has a thin-walled, tubular sleeve 19 of circular-annular cross section. Beginning at the receiving bore 15, the sleeve 19 receives a valve body 20 with a press fit. The valve body 20 has a valve seat 21 for a closing member 22 of a magnet armature 23 that is longitudinally movable in the sleeve 19. On the end remote from the valve body 20, the sleeve 19 is closed off by a magnet core 24, as part of the valve dome 16. Leaving an air gap 25 from the magnet armature 23, the magnet core 24 engages the sleeve 19 with a press fit and is joined to it by a weld seam 26 extending around it. This connection is pressure tight. A closing spring 27 engaging the magnet core 24 is received in the magnet armature 23 and in the position of repose of the valve 10 as shown keeps the closing member 22 in contact with the valve seat 21: the valve 10 is thus closed when the electromagnet is without current.

The hydraulic part 13 is a premounted unit with a stroke of the seat valve 28, formed by the valve seat 21 and the closing member 22, that is set before insertion into the receiving bore 15. This seat valve communicates on the one hand with an inlet conduit 29 and on the other with an outlet conduit 30 in the portion of the receiving bore 15 remote from the mouth. The hydraulic part 13 is received in pressure-tight fashion in the valve block 11 by a first swaged connection 31 located between the inlet conduit 29 and the outlet conduit 30. This swaged connection, which represents a positive engagement with the valve block 11, is described hereinafter in conjunction with other exemplary embodiments.

From the direction of the valve dome 16, a filter sleeve 34 associated with the inlet conduit 29, a sealing ring 35, and a support ring 36 are slipped onto the sleeve 19 of the hydraulic part 13. The receiving bore 15 is sealed off in pressure-tight fashion from the boundary plane 17 by the sealing ring 35 surrounding the hydraulic part 13. To that end, a bushing 37 is slipped from the valve dome 16 onto the hydraulic part 13 of the valve 10; its relatively thick tube wall 38 surrounds the sleeve 19 with slight radial play in the region of the magnet armature 23. On its side toward the support ring 36, the bushing 37 has a radially extending flange 39. This flange 39 is supported in the receiving bore 15 on a bore step 40 and is joined to the valve block 11 by a second swaged connection 41. This second swaged connection 41 is attained by caulking of deforming the edge toward the mouth of the receiving bore 15, at which displaced material of the valve block 11, taking the form of a bead 42, covers the flange 39 toward the mouth. This positively engaged connection is capable of absorbing hydraulic forces bearing on the sealing ring 35 and diverting them to the valve block 11.

The electrical part 14 of the valve 10 is mounted, after the bushing 37 is secured in the valve block 11, onto the valve dome 16 in the region of the magnetically active elements, the magnet armature 23 and the magnet core 24. The electrical part 14 has an electrical coil 45, which surrounds the valve dome 16 essentially toward the magnet core. The coil 15 is engaged on the outside by a housing 46 of soft magnetic material, into which an annular disk 47, likewise of soft magnetic material, is press-fitted at the bottom. On the face end of the housing 46 remote from the boundary plane 17, connection pins 48 of the coil 45 are formed. The housing 46 of the electrical part 14, preferably without play, surrounds the magnet core 24 on the one hand and on the other, with its annular disk 47 surrounds, the tube wall 38 toward the magnet armature of the bushing 37. On excitation of the electrical coil 45, the bushing 37, like the magnet core 24, the housing 46, and the annular disk 47, helps conduct the magnetic flux to the magnet armature 23 of the hydraulic part 13. The magnetically operative magnet core 24 shifts the magnet armature 23 to the open position of the valve 10.

The first swaged connection 31 serving to secure the hydraulic part 13 of the valve 10 in the valve block 11 is embodied as follows (see FIG. 2): the valve body 20 of the seat valve 28 takes the form of a straight circular cylinder. With the predominant portion of its length, it is received with a press fit in the sleeve 19 of the hydraulic part 13. The valve body 20, in its middle portion, has an annular groove 51 of triangular cross section. The terminal portion 52 of the sleeve 19 is pressed, along the entire groove circumference, against the groove wall 53 of the annular groove toward the magnet armature by crimping. The portion of the valve body 20 not encompassed by the sleeve 19 engages, with slight play, a portion 54 of the receiving bore 15 toward the outlet conduit. This portion 54 of the bore terminates at an encompassing edge 55 of the receiving bore 15. After that, the receiving bore 15 widens to an extent that slightly exceeds the outer diameter of the sleeve 19. In its further course, the receiving bore 15 is widened toward the boundary plane 17 to a portion 57 of relatively large diameter, forming a bore step 56. This portion 57 provides space for a deforming tool 58 that surrounds the hydraulic part 13 with slight play; of this tool, only the portion toward the bore is shown in FIGS. 2–5.

The encompassing edge 55 of the receiving bore 15 forms a stop that limits the insertion depth of the hydraulic part 13 in the valve block 11; the portion 52 of the sleeve 19 is crimped into the annular groove 51 and engages this stop before the first swaged connection 31 is made. This swaged connection 31 is made by lowering the deforming tool 58, in such a way that after striking the bore step 56 that greatly widens the receiving bore 15, the tool displaces material of the valve block 11 into the annular groove 51. As FIG. 3 clearly shows, the displaced material fills up the annular groove 51, and along with the positive engagement attained by the crimping of the sleeve portion 52 it also brings about a nonpositive engagement between the sleeve 19 and the valve body 20, which reinforces the tightness and strength of the first swaged connection 31. After the first swaged connection 31 is made, the deforming tool 58 releases the hydraulic part 13 of the valve 10, so that the mounting of the individual parts, mentioned above, of the valve in the receiving bore 15 can be done.

In a departure from this embodiment of the first swaged connection 31, the sleeve 19 may be lengthened axially beyond the annular groove 51. In that case, a positive engagement of the sleeve 19 with the valve body 20 is attainable by beading in of the sleeve into the annular groove 51. As a result, the sleeve 19 is pressed positively against both walls of the annular groove 51. If the encompassing edge 55 is to be used as a stop, then in this embodiment the portion of the valve body 20 after the annular groove 51, toward the magnet armature, must be embodied smaller in diameter, as is shown for the exemplary embodiment of FIG. 4.

Figure 4:
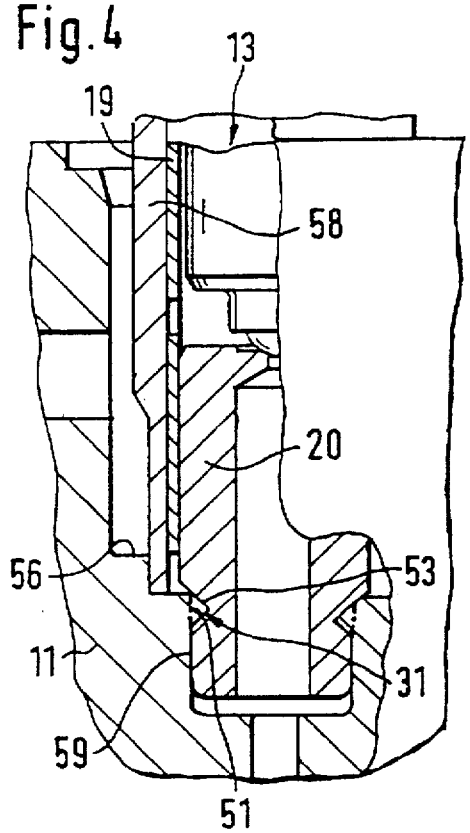
FIG. 4 shows a second embodiment of the aforementioned connection after the swaging.

The exemplary embodiment shown in FIG. 4 is distinguished in that the sleeve 19 terminates on its face end at a distance before the annular groove 51 of the valve body 20. The valve body 20 is provided after the annular groove 51 with a shoulder 59 that reduces its diameter. As a result, it is attained that the wall 53 of the annular groove 51 toward the sleeve and having the larger diameter, before the first swaged connection 31 is made, engages a stop formed by the encompassing edge 55 of the receiving bore 15 and limiting the insertion depth of the hydraulic part 13 into the valve block 11, as is suggested by a dot-dashed line in the region of the annular groove, as in FIG. 2. FIG. 4 shows the status after the deforming operation has been concluded, by means of which material of the valve block 11 has been displaced into the annular groove 51 located in the region of the shoulder 56 of the valve body 20.

Figure 5:
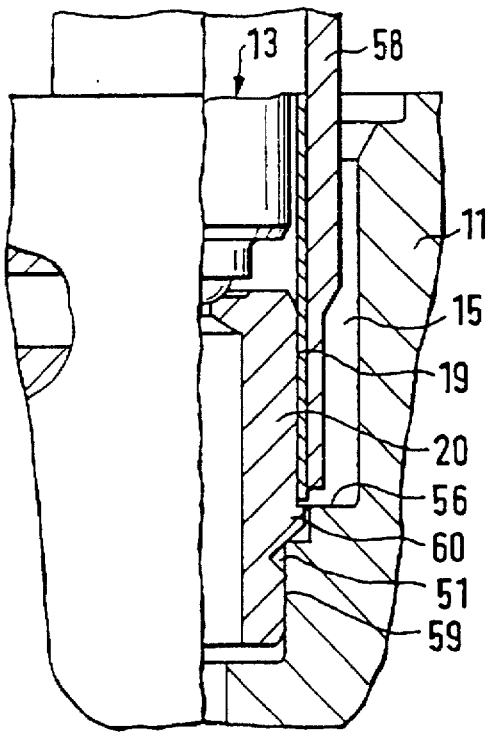
FIG. 5 shows a third embodiment of this connection prior to the swaging operation.

The exemplary embodiment of FIG. 5 shows the status before the caulking operation. Here, as in the exemplary embodiment of FIG. 4, the valve body 20 is provided with a diameter-reducing shoulder 59. The annular groove 51 is again located in the region of the shoulder 59. The valve body 20 is also nonpositively surrounded by the sleeve 19 over only a portion of its length. Between the annular groove 51 and the sleeve 19, the valve body 20 has an encompassing shoulder 60 that reduces its diameter to the outer diameter of the sleeve. The purpose of this shoulder is, when the swaged connection 31 is made, to reinforce the flow of material, displaced by the shoulder 56 of the receiving bore 15, from the valve block 11 into the annular groove 51.

The foregoing relates to preferred exemplary embodiments of the invention, it being understood that other variants and embodiments thereof are possible within the spirit and scope of the invention, the latter being defined by the appended claims.

What is claimed is:

1. A hydraulic unit (12) for traction-controlled brake systems of motor vehicles, having the following characteristics:

at least one electromagnetically actuated valve (10) is disposed on a metal valve block (11), the valve (10) has a hydraulic part (13), received in a stepped receiving bore (15) of the valve block (11), and an electrical part (14), which is mounted on a valve dome (16) of the hydraulic part (13), said dome fits over a boundary plane (17) of the valve block (11), the hydraulic part (13) has a tubular sleeve (19), in which, beginning at the receiving bore (15), a secured valve body (20) with a valve seat (21), a longitudinally movable magnet armature (23) with a valve closing member (24), and a likewise secured magnet core (24) are received, the hydraulic part (13) is a premounted unit with a stroke, set before the insertion into the receiving bore (15), of the seat valve (28) formed by the valve seat (21) and the valve closing member (22), the seat valve (28) communicates with an inlet conduit (29) and with an outlet conduit (30) of the receiving bore (15), the receiving bore (15) is sealed off from the boundary plane (17) by a sealing ring (35) surrounding the hydraulic part (13), the hydraulic part (13) is joined at least indirectly by positive engagement to the valve block (11), the hydraulic part (13) is received in a pressure-tight fashion in the valve block (11) by means of a first swaged connection (31) located between the inlet conduit (29) and the outlet conduit (30);

the receiving bore (15) is closed off between the sealing ring (35) and the boundary plane (17) by a radially extending flange (39) of a bushing (37) that is slipped onto the hydraulic part (13);

the flange (39) of the bushing (37) is braced against a bore step (40) of the receiving bore (15) and is joined to the valve block (11) by a second swaged connection (41).

2. The hydraulic unit of claim 1, in which the valve body (20) has an annular groove (51), on its outer circumference, for receiving material of the valve block (11) displaced from a bore step (56) of the receiving bore (15) to make the first swaged connection (31).

3. The hydraulic unit of claim 2, in which an end of the sleeve (19) is beaded into the annular groove (51).

4. The hydraulic unit of claim 2, in which the annular groove (51) is triangular in cross section, and a terminal portion (52) of the sleeve (19) is pressed against one wall (53) of this groove, along an entire circumference of the groove, by crimping.

5. The hydraulic unit of claim 4, in which before the first swaged connection (31) is made, the crimped-in portion (52) of the sleeve (19) in the annular groove (51) engages a stop formed by an encompassing edge (55) of the receiving bore (15), the stop limits the insertion depth of the hydraulic part (13) into the valve block (11).

6. The hydraulic unit of claim 2, in which the valve body (20), which is surrounded over only a portion of its length by the sleeve (19), has a diameter-reducing shoulder (59) in a portion free of the sleeve, and that the annular groove (51) is located in the region of the shoulder (59).

7. The hydraulic unit of claim 6, in which the larger-diameter wall (53), toward the sleeve, of the annular groove (51), before the first swaged connection (31) is made, engages a stop formed by an encompassing edge (55) of the receiving bore (15), the stop limiting the insertion depth of the hydraulic part (13) into the valve block (11).

8. The hydraulic unit of claim 6, in which the valve body (20), between the annular groove,(51) and the sleeve (19), has an encompassing shoulder (60) that increases its diameter to the outer diameter of the sleeve (19).

* * * * *